(No Model.)

M. A. LINDER & C. A. CARLSON.
BEDBUG TRAP.

No. 431,815. Patented July 8, 1890.

WITNESSES:
INVENTORS

UNITED STATES PATENT OFFICE.

MONS A. LINDER AND CARL A. CARLSON, OF PULLMAN, ILLINOIS.

BEDBUG-TRAP.

SPECIFICATION forming part of Letters Patent No. 431,815, dated July 8, 1890.

Application filed January 3, 1890. Serial No. 335,770. (No model.)

*To all whom it may concern:*

Be it known that we, MONS A. LINDER and CARL A. CARLSON, citizens of the United States, and residents of Pullman, in the county of Cook and State of Illinois, have invented new and useful Improvements in Bedbug-Traps, of which the following is a specification.

Our invention consists in bedbug - trap powder attachments for bedstead-casters contrived for ready application to ordinary casters, and being specially arranged for protection against access to the poisonous powder by children and so that contact of the bedstead with the wall of the room above the trap is prevented, all as hereinafter fully described, reference being made to the accompanying drawings, in which—

Figure 1:
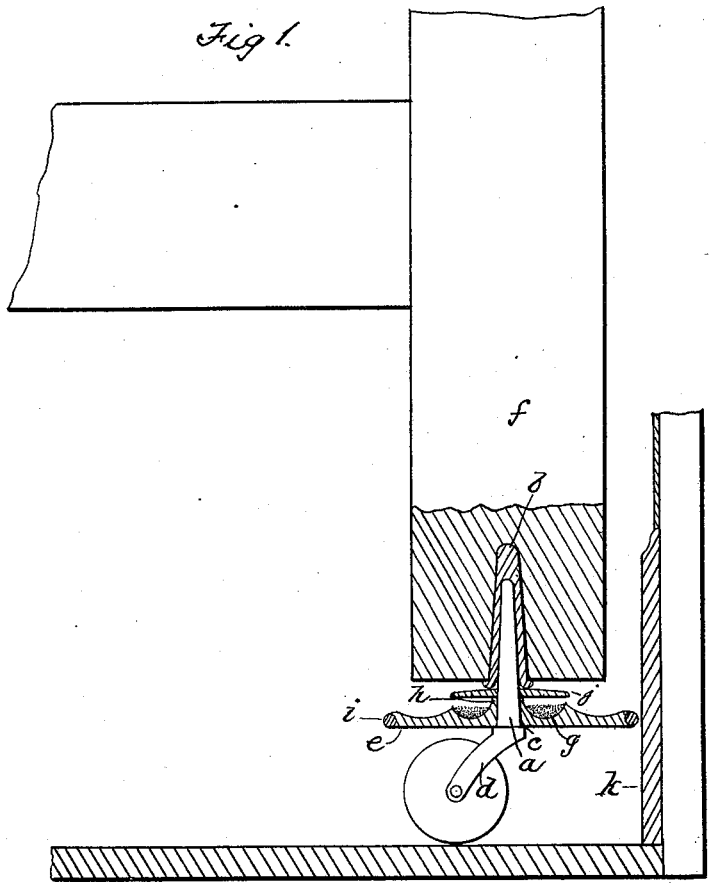
Figure 2:
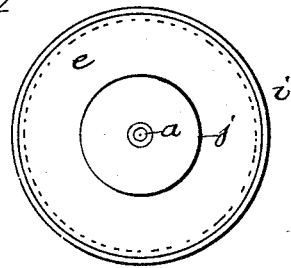

Figure 1 is a side elevation of part of a bedstead-trap and part of the leg being in section, and Fig. 2 is a top plan view of the trap.

To the shank $a$ of an ordinary or any approved caster having a socket $b$ of suitable depth to rest at the bottom of the socket on the top of the shank and afford the requisite space between the lower end of the socket and the shoulder $c$ of the shank above the forks $d$, we apply the disk $e$, of considerably larger diameter than the greatest diameter of the leg $f$, and having the cup-groove $g$ surrounding the hub $h$, of considerably less radius than that of the leg $f$ directly above, which thus renders the cup inaccessible to children, said disk also having a rubber or other elastic fender-ring $i$ shrunk into a groove in its periphery to prevent injury to the base-board of the room in fending the bedstead off from the wall; and above this disk and on its hub $h$, which extends a little higher than the surface of said disk outside of the cup-groove, we arrange the cover-disk $j$, which overhangs the cup at a distance, which prevents the insects from climbing onto its periphery from the surface of the disk $e$ outside of the cup, and cuts off any possibility of ascending without crossing the powder with which the cup is charged, and then crawling back on the under side of disk $j$ to its edge, thus exposing them directly to the effects of the powder while crossing it and indirectly while crawling back under disk $j$, supposing it possible for any to get so far; and besides, disk $j$ will be polished to prevent as much as possible the return of any that might possibly succeed in crossing the powder alive.

It will be seen that the powder-cup is so close under the end of the leg, and the space between the end of the leg and the upper side of disk $e$ is so limited, that the danger of children getting at the poison is effectually provided for. The rubber fender-ring prevents injury to the base-board $k$, and a very effective trap is provided simply by the application of the two disks $e$ and $j$ to the shank of the common caster.

So far as the fork and the roller of the caster are concerned, they may be of any approved form or kind. The invention is applicable to any caster connected to the leg by the shank and socket.

We claim as our invention—

The improved bedbug-trap, consisting of the two disks $e$ and $j$, fitted on the shank of the caster, said disk $e$ having the cup-groove for the powder in close proximity to the shank of the caster and having larger radius than the bedstead-leg and fitted with an elastic periphery for a wall-guard, and said cover-disk placed slightly higher than the cup-disk and close under the larger over projecting lower end of the bedstead-leg, substantially as described.

In testimony that we claim the foregoing as our invention we have signed our names, in presence of two witnesses, this 5th day of October, 1889.

MONS A. LINDER.
    CARL A. CARLSON.

Witnesses:
  THOMAS A. E. HOLCOMB,
  EDWARD CARLSON.